United States Patent [19]

Saito

[11] Patent Number: 4,676,332
[45] Date of Patent: Jun. 30, 1987

[54] EXHAUST PIPE SUPPORTING STRUCTURE

[75] Inventor: Akito Saito, Tokyo, Japan

[73] Assignee: Honda Giken Kogyo Kabushiki Kaisha, Tokyo, Japan

[21] Appl. No.: 831,214

[22] Filed: Feb. 20, 1986

[30] Foreign Application Priority Data

Feb. 21, 1985 [JP]  Japan .............. 60-23928[U]
Feb. 21, 1985 [JP]  Japan .............. 60-23929[U]
May 14, 1985 [JP]  Japan .............. 60-71162[U]

[51] Int. Cl.$^4$ ............................................. B60K 13/04
[52] U.S. Cl. .................................. 180/89.2; 180/219; 248/60; 267/63 R
[58] Field of Search .............. 180/219, 228, 309, 89.2, 180/296; 248/60; 267/141, 153, 63 R

[56] References Cited

U.S. PATENT DOCUMENTS

| 3,315,951 | 4/1967 | Boschi | 267/141 |
| 4,116,411 | 9/1978 | Masuda | 180/89.2 |
| 4,349,078 | 9/1982 | Shimada et al. | 180/89.2 |

FOREIGN PATENT DOCUMENTS

| 55-94225 | 6/1980 | Japan . |
| 459216 | 10/1935 | United Kingdom . |
| 576424 | 4/1946 | United Kingdom . |
| 703938 | 2/1954 | United Kingdom . |
| 826046 | 12/1959 | United Kingdom . |
| 1058311 | 2/1967 | United Kingdom . |
| 1221830 | 2/1971 | United Kingdom . |
| 492433 | 7/1978 | United Kingdom . |

*Primary Examiner*—John J. Love
*Assistant Examiner*—Donn McGrehan
*Attorney, Agent, or Firm*—Armstrong, Nikaido, Marmelstein & Kubovcik

[57] ABSTRACT

An exhaust pipe supporting structure (10) comprising an anti-vibratory member (14) reduced in spring coefficient, gradually along the length from one part (14a, 8b) thereof connected at the side of a vehicle body (6, 8) to another part (14b, 13) thereof connected at the side of an exhaust pipe (2, 3, 11, 12, 13) drawn out from an engine (1) mounted at the vehicle body side. In a view from a point off in a direction in which a torque roll axis (Tro) of the engine (1) or a principal axis (Io) of inertia extending in the same direction as the torque roll axis (Tro) extends, the aforesaid one part (14a, 8b) of the elastic member (14) and the aforesaid another part (14b, 13) thereof are found on a single tangent line (L$_1$) to an imaginary arc (22) of a predetermined radius that has the torque roll axis (Tro) or the principal axis (Io) of inertia as a center axis thereof.

3 Claims, 9 Drawing Figures

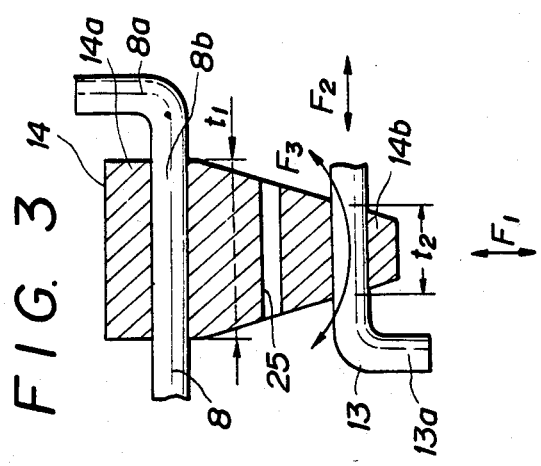
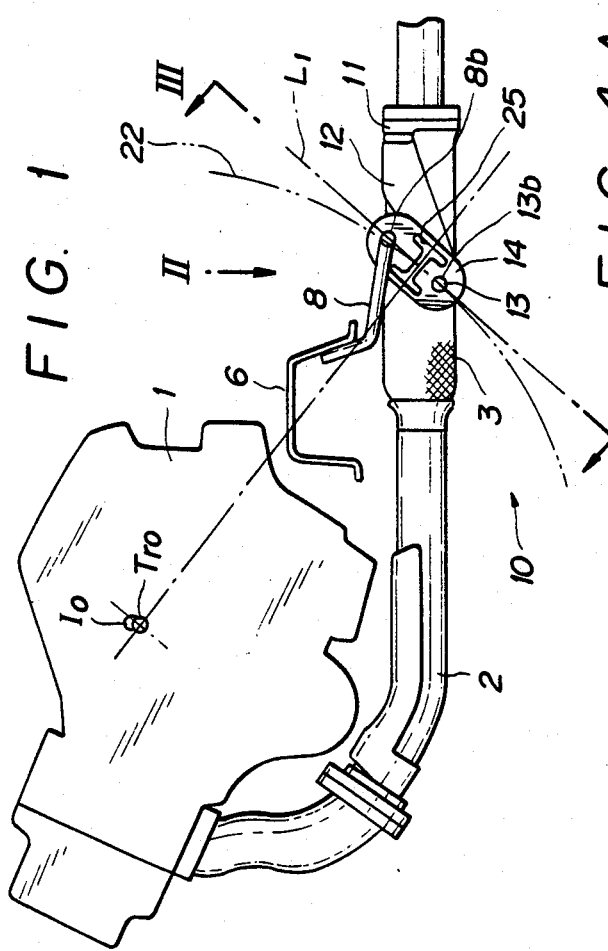
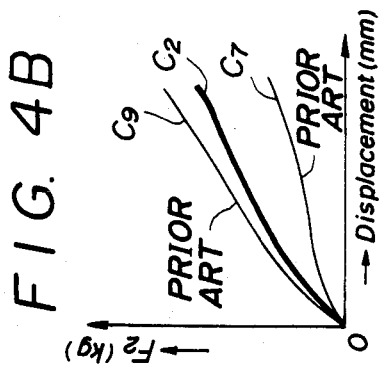
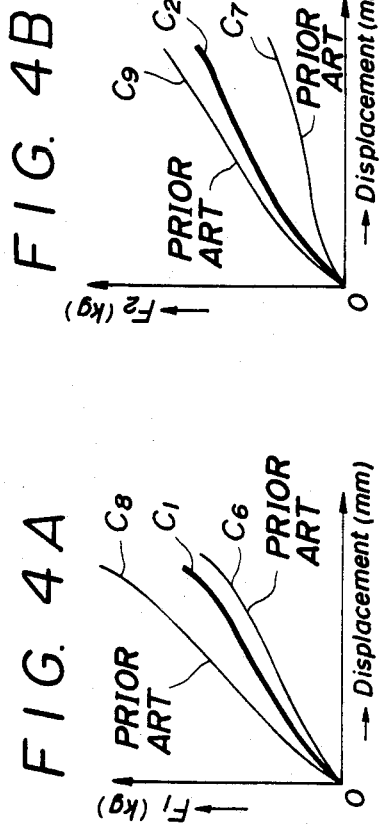
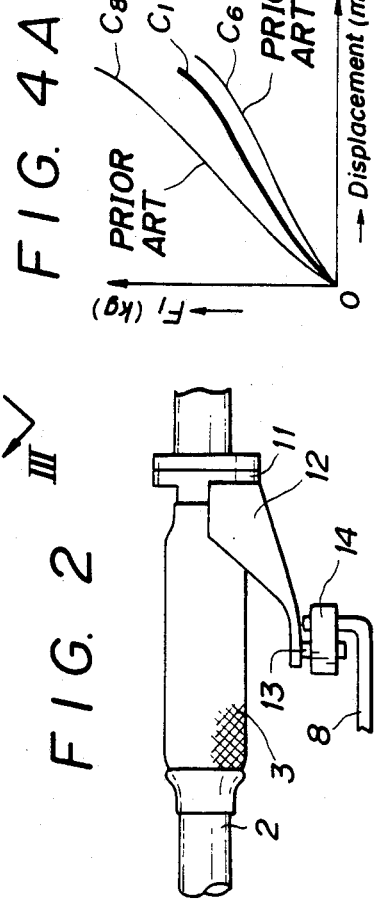

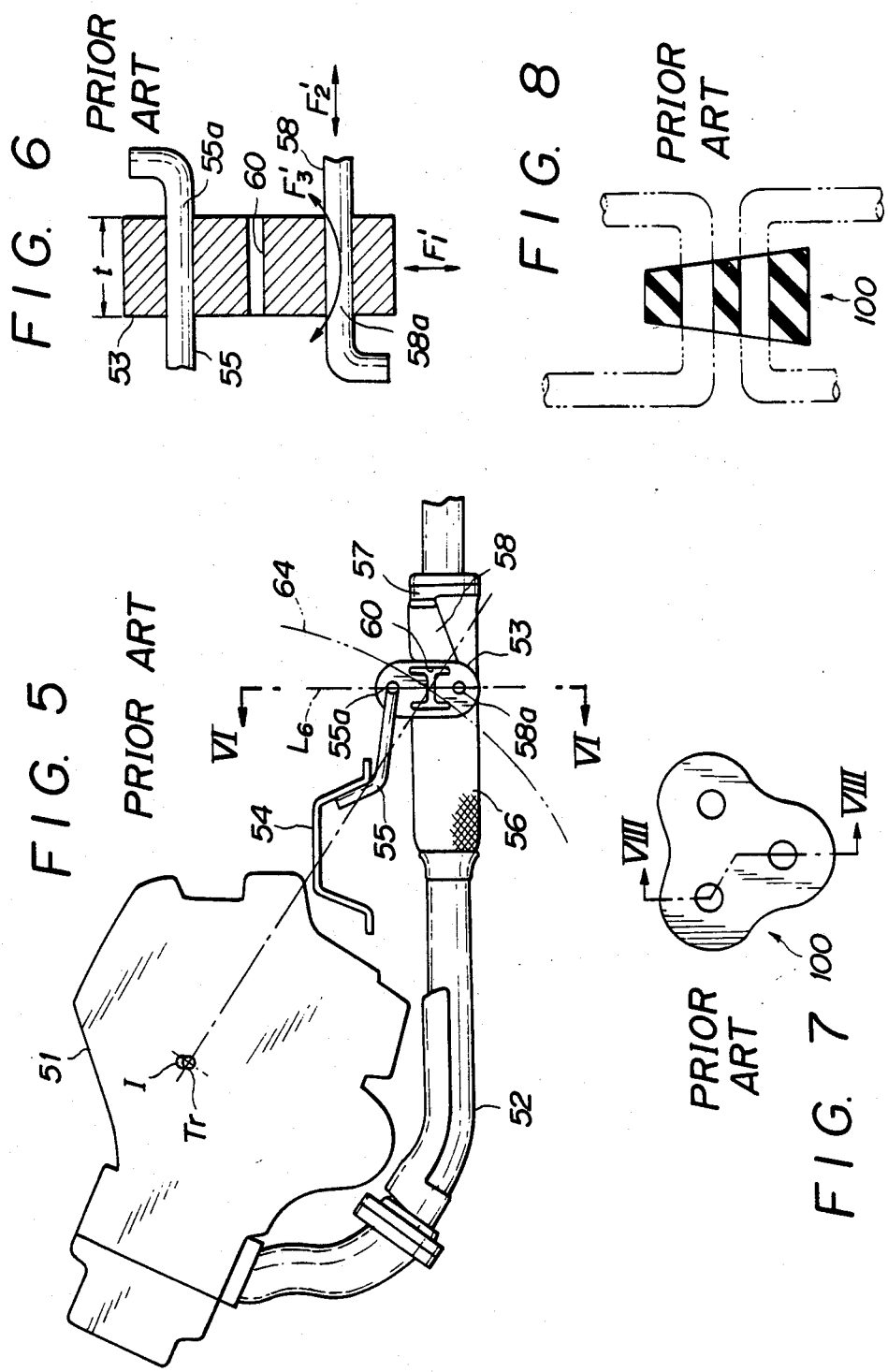

1 …

EXHAUST PIPE SUPPORTING STRUCTURE

BACKGROUND OF THE INVENTION

1. Field of the Invention

The present invention generally relates to a supporting structure for exhaust pipes. More particularly, the invention relates to a supporting structure for exhaust pipes such as in a vehicle, of the type with which an exhaust pipe drawn out from an engine is supported at the side of a vehicle body through an elastic member.

2. Description of Relevant Art

In general, the exhaust pipe, which is drawn out from an engine installed in a vehicle, is supported at the side of a body of the vehicle through an elastic member.

In the accompanying drawings, FIG. 5 is a schematic side view exemplarily showing such supporting structure for exhaust pipes.

In this exhaust pipe supporting structure, a flexible tube 56, which constitutes a substantially intermediate part of an exhaust pipe 52 drawn out from an engine 51 mounted at the side of a body (not shown) of a vehicle, is supported at the side of a frame 54 of the vehicle body through an elastic member 53 as an anti-vibratory member, with an intention to thereby prevent the transmission of vibrations from the exhaust pipe 52 to the side of the vehicle body, while restricting the displacement of the exhaust pipe 52.

The engine 51 is of a horizontal type disposed in the front part of the vehicle, and the exhaust pipe 52 is extended therefrom once downwardly and then substantially horizontally in the longitudinal direction of the vehicle.

Detailed description will now be made of this exhaust pipe supporting structure.

The elastic member 53 is of a circular form elongated in the vertical direction in side view, and has a uniform thickness t (see FIG. 6) in the transverse direction of the vehicle.

At the upper part of the elastic member 53, there is inserted therethrough an extension 55a as a bent part of a stay 55 which is fixed to the body frame 54 and extended in the rearward direction of the vehicle, whereby the elastic member 53 is supported at the vehicle body side.

Further, from a flange 57 at the rear end of the flexible tube 56 is standing a bracket 58 in the frontward direction of the vehicle. The bracket 58 has at the front end thereof a pin 58a projected therefrom in the transverse direction of the vehicle. The pin 58a is inserted into the lower part of the elastic member 53, whereby the exhaust pipe 52 is supported at the vehicle body side through the member 53.

Incidentally, in FIG. 5, designated at reference numeral 60 is a slot punched to be opened, in the form of a letter "H" in side view, through the vertically central part of the elastic member 53, in the thickness direction thereof.

Moreover, as shown in FIG. 5, a line segment $L_6$ passing a connection point 55a at the vehicle body side of the elastic member 53 and the pin 58a as another connection point thereof at the side of the exhaust pipe 52 is set to be substantially vertical, in side view.

On the elastic member 53 arranged like this, there are acting, as shown in FIG. 6 which is a sectional view along line VI—VI of FIG. 5, forces (collectively designated by reference character $F_1'$) in the tension/compression direction of the member 53 as well as forces (likewise designated by reference character $F_2'$) in the shearing direction thereof. Further, in cases where the forces $F_1'$, $F_2'$ are caused to concurrently act on the elastic member 53, there are resulted such forces (likewise designated by reference character $F_3'$) that act on the member 53 with a tendency to rotate the elastic member in either direction of rotation about the connection point 55a as a supporting point thereof at the vehicle body side.

In this concern, in FIGS. 4A and 4B, designated at $C_6$, $C_7$ are characteristic curves showing, for a case where the thickness t of the elastic member 53 is relatively small, those relations to be observed, in the tension/compression direction and the shearing direction of the member 53, respectively, between various values, in terms of kg, of the forces $F_1'$, $F_2'$ acting on the member 53 and displacements D, in terms of mm, by corresponding deformations of the member 53.

As will be comprehended, the elastic member 53 is not well adapted for effective exhibition of restraint against the respective external forces $F_1'$, $F_2'$.

In view of such characteristic of the elastic member 53, the restraint by the member 53 against the force $F_1'$ in the tension/compression direction thereof might well be raised by employing such an elastic member as one higher in spring coefficient or spring rate than the member 53 but similar thereto in configuration and size, including thickness. But, in this case, it would be hardly possible to raise the restraint against the force $F_2'$ in the shearing direction of the elastic member 53.

On the other hand, by way of such a modification that the thickness t of the elastic member 53 be increased, the restraint against the force $F_2'$ in the shearing direction of the member 53 might well be raised as shown by curve $C_9$ of FIG. 4B. In this case, however, the restraint against the force $F_1'$ in the tension/compression direction of the elastic member 53 would be excessively raised as shown by curve $C_8$ of FIG. 4A, in addition to corresponding increase in the quantity of rubber to be used as such elastic member, as well as in cost.

In this respect, in Japanese Utility Model Lay-Open Print No. 55-94225 laid open on June 30, 1980, there is disclosed a different type of elastic member as an antivibratory member to be used in an exhaust pipe supporting structure for vehicles.

In the accompanying drawings, FIGS. 7 and 8 are a side and a sectional views of an elastic member 100 of the disclosed type.

The elastic member 100 is gradually enlarged in thickness along its length from the upper part to the lower part thereof, with an intention to thereby make uniform the respective deformations at various points along the length of the member 100, when it is subjected to forces acting in the tension/compression direction and the shearing direction thereof.

However, the restraint by the elastic member 100 is not yet sufficiently effective against such forces that act on the member 100, in the rotating direction, like the force $F_3'$ acting on the member 53.

Referring again to FIG. 5, designated at reference character Tr is a torque roll axis adapted to serve as a center axis of vibrations of the engine 51 when the vehicle is accelerated or decelerated. In accordance with horizontal arrangement of the engine 51, the torque roll axis Tr is set so as to extend in the transverse direction of the vehicle.

The vertical line segment $L_6$, on which the connection points 55a, 58a of the elastic member 53 are located as described, is designed so as to cross, in side view, an imaginary arc 64 as a part of such a circle about the torque roll axis Tr that passes the center of gravity of the member 53.

In other words, the two connecting points 55a, 58a of the elastic member 53 will not be both found on any imaginary arc of an arbitrary radius that has the center thereof on the torque roll axis Tr.

Accordingly, no vibrating forces on the exhaust pipe 52 due to engine vibrations about the torque roll axis Tr will substantially act as a force on the elastic member 53 in the tension/compression direction thereof. Against such engine vibrations, therefore, the restraint by the elastic member 53 is low, thus resulting in the difficulty of effectively reducing the engine vibration by use of the afore-mentioned exhaust pipe supporting structure. Besides, if managed to be adapted for such reduction, this supporting structure would be complicated in constitution and would be expensive.

Incidentally, the above comments on the torque roll axis Tr applies also to one I of the principal axes of inertia of the engine 51 that extends in the same direction as the torque roll axis Tr and functions as a principal center axis of vibrations of the engine 51 while the vehicle is not accelerated or decelerated. Though, generally, depending on the engine structure, the principal axis I and the torque roll axis Tr are coincident with each other in the example shown.

Such problems in conventional exhaust pipe supporting structures of the type described are particularly remarkable in an FF (front-engine, front-drive) type vehicle with an engine arranged horizontal, in which, in plan view, an exhaust pipe is rearwardly directed to be perpendicular to a torque roll axis of the engine or to such principal axis of inertia thereof as extending in the same direction as the torque roll axis, so that an exhaust system is greatly affected by engine vibrations about the torque roll axis or the principal axis of inertia.

The present invention has been achieved to effectively solve such problems in conventional exhaust pipe supporting structures of the type described.

SUMMARY OF THE INVENTION

Accordingly, an object of the present invention is to provide an exhaust pipe supporting structure permitting effective restriction of those forces which act on an elastic member that interconnects an exhaust pipe with the side of a vehicle body, in the tension/compression direction and the shearing direction of the elastic member, as well as in the rotating direction thereof.

Another object of the present invention is to provide, in the exhaust pipe supporting structure, such adaptation that those vibratory forces of the exhaust pipe which are due to vibrations of an engine about a torque roll axis of the engine or about one of the principal axes of inertia of the engine that extends in the same direction as the torque roll axis are made to act, against the elastic member, as forces in such a direction as to be coincident with the tension/compression direction of the elastic member, to thereby effectively reduce the engine vibrations.

To achieve the afore-mentioned object, the present invention provides an exhaust pipe supporting structure comprising an anti-vibratory member connected at one part thereof to the side of a vehicle body and at another part thereof to the side of an exhaust pipe drawn out from an engine mounted at the vehicle body side, wherein the anti-vibratory member is gradually reduced in spring coefficient or spring rate along the length from the aforesaid one part thereof to the aforesaid another part thereof.

Advantageously, in a view from a point off in a direction in which a torque roll axis of the engine is extended, the anti-vibratory member is disposed such that the aforesaid one part thereof and the aforesaid another part thereof are found on a single tangent line to an imaginary arc of a predetermined radius that has the torque roll axis as a center axis thereof so that those vibratory forces of the exhaust pipe which are due to vibrations of the engine about the torque roll axis are made to act, with respect to the anti-vibratory member, as a force in a tension/compression direction.

More preferably, in a view from a point off in a direction in which a principal axis of inertia extending in the same direction as a torque roll axis of the engine extends, the anti-vibratory member is disposed such that the aforesaid one part thereof and the aforesaid another part thereof are found on a single tangent line to an imaginary arc of a predetermined radius that has the principal axis of inertia as a center axis thereof so that those vibratory forces of the exhaust pipe which are due to vibrations of the engine about the principal axis of inertia are made to act, with respect to the anti-vibratory member, as a force in a tension/compression direction.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

In the drawings:

FIG. 1 is a side view of an exhaust pipe supporting structure according to a preferred embodiment of the present invention;

FIG. 2 is a plan view of the exhaust pipe supporting structure, as it is seen along arrow II of FIG. 1;

FIG. 3 is a sectional view along line III—III of FIG. 1, showing a longitudinal section of an elastic member as an anti-vibratory member in the exhaust pipe supporting structure;

FIGS. 4A and 4B are graphs showing, for a tension/compression direction and a shearing direction of the elastic member of FIG. 3, respectively, associated displacement characteristics of the elastic member, by way of comparison with a first example of relevant art;

FIG. 5 is a side view of an exhaust pipe supporting structure according to the first example of relevant art, as described;

FIG. 6 is a sectional view along line VI—VI of FIG. 5, as described; and

FIGS. 7 and 8 are a side and a sectional views of an elastic member as an anti-vibratory member used in an exhaust pipe supporting structure according to a second example of relevant art, as described.

DETAILED DESCRIPTION OF THE PREFERRED EMBODIMENT

Referring now to FIG. 1, designated at reference numeral 10 is an exhaust pipe supporting structure according to a preferred embodiment of the present invention. The supporting structure 10 comprises an elastic member 14 as an anti-vibratory member interposed between an exhaust pipe 2 drawn out from a horizontal engine 1 of an FF type vehicle (not shown) and extended once rearwardly-inclinedly downwardly and then rearwardly horizontally of the vehicle and a rear beam 6 connected to the side of a body (not shown) of the vehicle.

The elastic member 14 is of an elongated circular form in side view, and reduced, in thickness in the transverse direction of the vehicle that is perpendicular to the longitudinal direction of the exhaust pipe 2, gradually along the length from the upper part to the lower part thereof, as will be described later.

As shown also in FIGS. 2 and 3, the elastic member 14 has inserted through an upper portion 14a thereof, in the thickness direction of the member 14, an extension 8b as a bent part of a stay 8 which is fixed to the rear beam 6 and extended in the rearward direction of the vehicle, whereby the elastic member 14 is supported at the side of the vehicle body. Incidentally, in FIG. 3, designated at reference character 8a is a bent end part of the stay 8.

Further, from a flange 11 at the rear end of a flexible tube 3 there extends a bracket 12 in the frontward direction of the vehicle. The bracket 12 has at the front end thereof a pin 13 projected therefrom in the transverse direction of the vehicle. The pin 13 is inserted in the thickness direction of the elastic member 14 to a lower portion 14b of the member 14, whereby the exhaust pipe 2 is supported at the vehicle body side through the elastic member 14.

Incidentally, in FIG. 3, designated at reference character 13a is a bent end part of the pin 13, and 25 is a slot punched to be opened, in the form of a letter "H" in side view, through a longitudinally central part of the elastic member 14, in the thickness direction thereof.

In the engine 1, which is of a horizontal type, there is provided a torque roll axis Tro extending substantially in the transverse direction of the vehicle. On the other hand, in side view, a line segment $L_1$ passing a connection point 8b to the vehicle body side of the elastic member 14 and the pin 13 as another connection point thereof at the side of the exhaust pipe 2 is set tangential to an imaginary arc 22 as a part of such a circle about the torque roll axis Tro that passes the center of the elastic member 14, in side view.

In this respect, the engine 1, as it is inclusive of integral members such as a transmission (not shown), has three principal axes of inertia extending substantially in the longitudinal, transverse, and vertical directions of the vehicle, respectively, among which the transverse principal axis Io is substantially coincident with the torque roll shaft Tro. It thus so follows that the imaginary arc 22 has the center thereof on the principal axis Io of inertia or, in other words, the line segment $L_1$ is tangential to the imaginary arc 22, as it has the center thereof on the principal axis Io, and hence the aforesaid connection points 8b, 13 on the line segment $L_1$ are located both on a single tangent line of the imaginary arc 22.

As shown in FIG. 3, the elastic member 14 is tapered in longitudinal section such that, letting the thickness at the upper and lower portions 14a, 14b thereof to be $t_1$ and $t_2$, respectively, the transition part therebetween is gradually reduced in thickness from $t_1$ to $t_2$.

In this concern, the elastic member 14 is made of a uniform rubber, and therefore the spring coefficient or spring rate with respect to forces acting in the tension/compression direction of the member 14, as well as in the shearing direction thereof, is rendered maximum at the upper portion 14a of the member 14 and gradually made smaller with transition along the length from the upper portion 14a to the lower portion 14b thereof, thus becoming minimum at the lower portion 14b.

On the elastic member 14 configured like this and arranged as described, there are acting those forces (collectively designated by reference character $F_1$) which have their lines of action in the tension/compression direction of the member 14 and those forces (likewise designated by reference character $F_2$) which have their lines of action in the shearing direction of the member 14 and, besides, under the condition that the forces $F_1$, $F_2$ are concurrently appearing, such forces (likewise designated by reference character $F_3$) that have their lines of action in either direction of rotation about the extension 8b as a supporting part at the vehicle body side.

In this respect, in FIGS. 4A and 4B, represented by characteristic curves $C_1$, $C_2$ are relations between various values, in terms of kg, of the forces $F_1$, $F_2$ acting on the elastic member 14, respectively, and associated displacements, in terms of mm, of the entirety of the member 14.

As will be comprehended, the elastic member 14 has exhibited, against both of the forces $F_1$, $F_2$ in the tension/compression direction and the shearing direction, such spring coefficients as adequate, as a whole, to perform effective restriction.

In other words, notwithstanding relatively large spring coefficients shown against forces $F_2$ in the shearing direction of the elastic member 14, the spring coefficient against the force $F_1$ in the tension/compression direction of the member 14 is kept from becoming excessively large.

Moreover, the elastic member 14, the thickness of which is rendered maximum $t_1$ at the upper portion 14a that functions as a center of rotation of the member 14 in cases where the force $F_3$ in the rotating direction is acting, is adapted to exhibit effective restriction against the force $F_3$ as well.

Incidentally, for comparison purpose, it is supposed that the thickness of the elastic member 14 be equal, at the upper portion 14a $t_1$ thick, to the uniform thickness of that elastic member in the relevant art which has such characteristics as shown by the curves $C_8$, $C_9$ of FIGS. 4A, 4B and, at the lower portion 14b $t_2$ thick, to the uniform thickness of that elastic member in the relevant art which has such characteristics as shown by the curves $C_6$, $C_7$ of FIGS. 4A, 4B.

Accordingly, the elastic member 14 has a smaller volume than the elastic member of the uniform thickness $t_1$ that has the characteristic curves $C_8$, $C_9$, so that cost reduction is possible for the member 14.

Further, on account of distinct orientation of the line segment $L_1$ passing the connection point 8b at the vehicle body side of the elastic member 14 and the connection point 13 at the exhaust pipe side thereof, which segment $L_1$ is tangential to the imaginary arc 22 having the torque roll axis Tro as the center axis thereof in the side view or in a view from a point off in a direction in which the axis Tro extends, those vibratory forces of the exhaust pipe 2 which are due to vibrations of the engine 1 about the torque roll axis Tro are made to act, against the elastic member 14, as a force or forces having a line or lines of action in such direction as to be coincident with the tension/compression direction of the member 14, thereby assuring effective exhibition of restraint by the member 14 against vibrations of exhaust system due to such engine vibration. As a result, the engine vibration about the torque roll axis Tro is effectively reduced by the elastic member 14.

Furthermore, since the principal axis Io of inertia extending in the transverse direction of the vehicle is substantially coincident with the torque roll axis Tro, the elastic member 14 is adapted for effective exhibition of restraint also against those vibrations of exhaust system which are due to engine vibrations about the principal axis Io of inertia of the engine 1 while the vehicle is not accelerated or decelerated.

Incidentally, in the exhaust pipe supporting structure 10 according to the present embodiment, the elastic member 14 made of a uniform rubber is reduced in thickness and hence in cross sectional area, gradually along the length from the upper portion 14a acting as a connecting part at the vehicle body side to the lower portion 14b acting as a connecting part at the exhaust pipe side, to thereby gradually change the spring coefficient of the member 14. In this respect, however, a similar effect may preferably be achieved by employment of an elastic member of which the rubber material or mechanical property is continuously or stepwise changed along its length, while having a uniform sectional area.

Moreover, in the exhaust pipe supporting structure 10, the elastic member 14 is connect at two points 8b, 13 to the side of the vehicle body and the side of the exhaust pipe 2, respectively, to thereby render the line segment $L_1$ passing the two points 8b, 13 tangential to the imaginary arc 22. In this respect, however, there may preferably employed an arrangement in which an elastic member is connected exemplarily at one point thereon to the vehicle body side and at two points thereon to the exhaust pipe side in such a manner that, while the three points above are cooperating together to have three interconnection line segments thereamong constituting a substantially isosceles triangle, a bisector of the angle between two equal sides of the triangle is made tangential to an imaginary arc of a predetermined radius that has the center axis thereof on a torque roll axis of an engine.

Further, according to the present embodimemt, the elastic member 14 is utilized so as to suspend the exhaust pipe 2 from the vehicle body side. In this respect, the present invention may be advantegeously applied to an exhaust pipe supporting structure in which an exhaust pipe is borne to be supported on the vehicle body side through an elastic member.

Furthermore, in the embodiment described, the structure 10 is employed for supporting the exhaust pipe 2 which is drawn out from the horizontal type engine 1 in the FF type vehicle. In this respect, it will be easily comprehended that the present invention may be advantageously applied also to a supporting structure for exhaust pipes in other engine arrangements, exemplarily of a vertical engine in an FR (front-engine, rear-drive) type vehicle.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:

1. An exhaust pipe supporting structure, comprising:
   an anti-vibratory member connected at a first end thereof to a side of a vehicle body and at a second end thereof to a side of an exhaust pipe extending out from an engine mounted in the vehicle body, wherein said anti-vibratory member is gradually reduced in its spring coefficient along its length from said first end thereof to said second end thereof, said anti-vibratory member being made of a uniform elastic material and being gradually reduced in cross-sectional area along the length from said first end thereof to said second end thereof; and
   said anti-vibratory member being substantially tapered to have a maximum thickness at said first end thereof and a minimum thickness at said second end thereof.

2. An exhaust pipe supporting structure according to claim 1, wherein:
   in a view from a point off in direction in which a torque roll axis of said engine is extended, said anti-vibratory member is disposed such that said first part thereof and said second part thereof lie on a single tangent line to an imaginary arc of a predetermined radius that has said torque roll axis as a center axis thereof so that vibratory forces of said exhaust pipe which are due to vibrations of said engine about said torque roll axis are made to act, with respect to said anti-vibratory member, as a force in a tension/compression direction of said anti-vibratory member.

3. An exhaust pipe supporting structure according to claim 1, wherein:
   in a view from a point off in a direction in which a principal axis of inertia extending in the same direction as a torque roll axis of said engine extends, said anti-vibratory member is disposed such that one first end thereof and said second end thereof lie on a single tangent line to an imaginary arc of a predetermined radius that has said principal axis of inertia as a center axis thereof so that vibratory forces of said exhaust pipe which are due to vibrations of said engine about said principal axis of inertia are made to act, with respect to said anti-vibratory member, as a force in a tension/compression direction thereof.

* * * * *